(No Model.)
L. HAUCK.
MECHANISM FOR OVERCOMING DEAD CENTERS.
No. 456,031. Patented July 14, 1891.
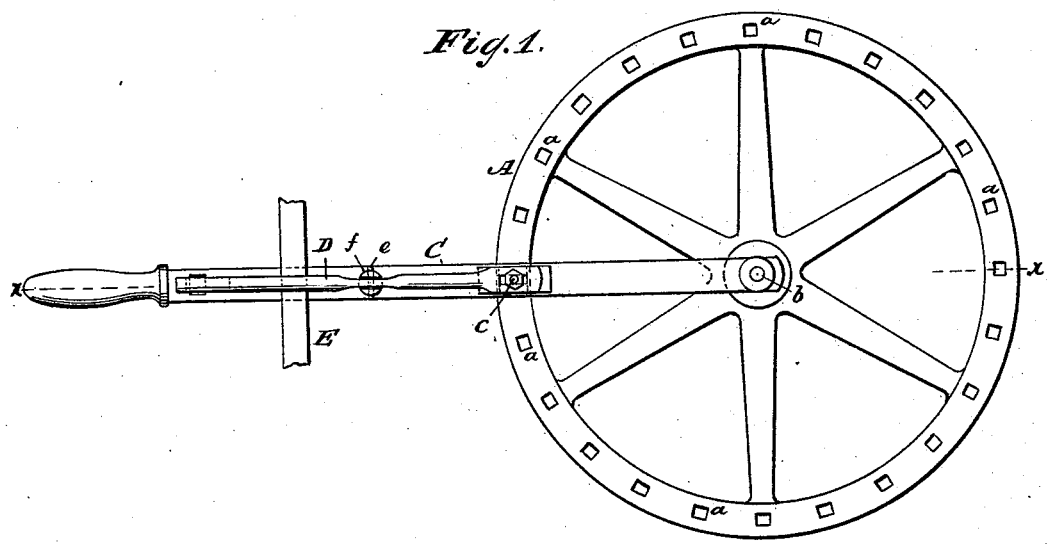
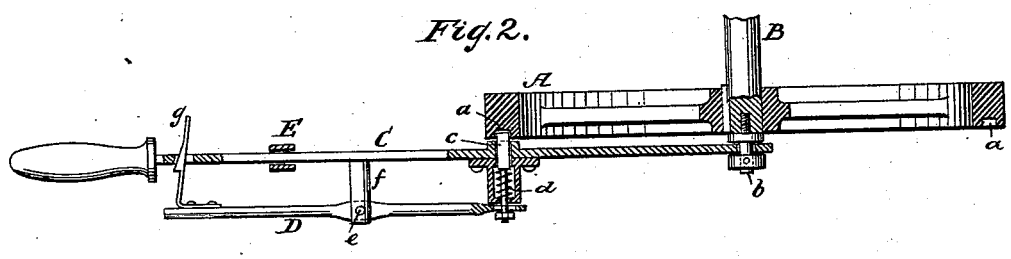
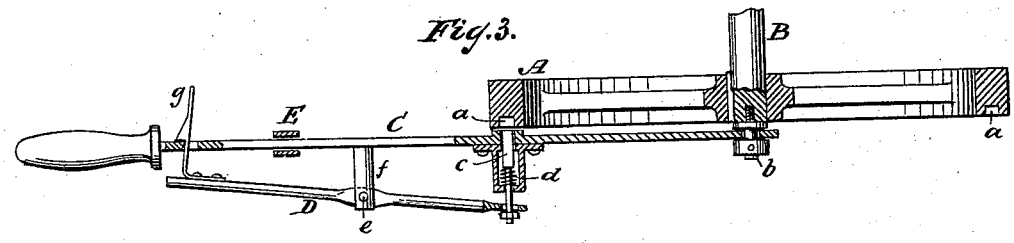
WITNESSES:
Edward Wolff
William L. Miller
INVENTOR:
Louis Hauck.
BY
Van Santvoord & Hauff
his ATTORNEYS

UNITED STATES PATENT OFFICE.

LOUIS HAUCK, OF NEW YORK, N. Y.

MECHANISM FOR OVERCOMING DEAD-CENTERS.

SPECIFICATION forming part of Letters Patent No. 456,031, dated July 14, 1891.

Application filed April 4, 1891. Serial No. 387,630. (No model.)

*To all whom it may concern:*

Be it known that I, LOUIS HAUCK, a citizen of the United States, residing at New York, in the county and State of New York, have invented new and useful Improvements in Mechanism for Moving Cranks of Engine and other Shafts from Off their Dead-Centers, of which the following is a specification.

My invention relates to a device for moving cranks of engine and other shafts from off their dead-centers.

The peculiar and novel construction of my device is pointed out in the following specification and claims and illustrated in the accompanying drawings, in which—

Figure 1 represents a face view of a wheel or pulley to which my ratchet-lever is applied. Fig. 2 is a horizontal section in the plane $x$ $x$, Fig. 1, when the ratchet-lever is in gear with the wheel. Fig. 3 is a similar view when the ratchet-lever is out of gear with the wheel.

In the drawings, the letter A designates a wheel, which is mounted on a shaft B. This shaft may represent the crank-shaft of an engine, or it may be in gear with such crank-shaft. The wheel A is provided with a series of cavities or holes $a$, and on the end of the shaft B is firmly secured a screw-stud $b$.

C is a lever which I term the "ratchet-lever," and which swings loosely on the stud $b$. It carries a dog $c$, adapted to engage the cavities $a$ in the wheel A. This dog is subjected to the action of a spring $d$, which has a tendency to force the same in gear with the wheel A, and the tail end of said dog engages a lever D, which has its fulcrum on a pivot $e$, mounted in a standard or lug $f$, which is secured to the ratchet-lever C. On the outer end of the lever D is secured a catch $g$, and when said lever is depressed to the position shown in Fig. 3 the catch $g$ engages the ratchet-lever C, and the dog $c$ is retained in its inoperative position. When the catch $g$ is thrown out of gear with the ratchet-lever C, the dog $c$ is free to be thrown in gear with the cavities $a$ in the wheel A by the action of the spring $d$.

E is a guide for the ratchet-lever. This guide is made of two bars which are fastened together at their ends, leaving sufficient room for the ratchet-lever to swing up and down between them. It may be fastened in the required position by any suitable means. As the dog $c$ of the ratchet-lever engages the successive holes in the wheel A, said wheel can be turned so as to move the crank-shaft from off its dead-centers.

What I claim as new, and desire to secure by Letters Patent, is—

1. The combination of the shaft B, having the stud $b$ secured in one extremity thereof, the wheel A, attached to the shaft in juxtaposition to the stud and provided in one side near the periphery with an annular series of cavities $a$, a swinging lever C, pivoted on the stud and extending along one side of the wheel, a dog $c$, sliding on the lever in a direction at right angles to its line of movement, for engaging and disengaging the cavities in one side of the wheel, and a lever for holding the dog out of engagement with the cavities in the wheel, substantially as described.

2. The combination, with the wheel A, mounted on a shaft B and provided with cavities $a$, of the ratchet-lever C, carrying the spring-actuated dog $c$, the stud $b$, secured in the end of the shaft B and forming the fulcrum for the ratchet-lever C, the lever D, connected to the ratchet-lever and to the dog $c$, and the catch $g$, carried by the lever D and constructed to engage the ratchet-lever, substantially as described.

In testimony whereof I have hereunto set my hand in the presence of two subscribing witnesses.

LOUIS HAUCK.

Witnesses:
WM. C. HAUFF,
E. F. KASTENHUBER.